(12) United States Patent
Tripathi et al.

(10) Patent No.: US 10,977,444 B2
(45) Date of Patent: Apr. 13, 2021

(54) METHOD AND SYSTEM FOR IDENTIFYING KEY TERMS IN DIGITAL DOCUMENT

(71) Applicant: Innoplexus AG, Eschborn (DE)

(72) Inventors: Gaurav Tripathi, Pune (IN); Vatsal Agarwal, Rampur (IN); Sudhanshu Shekhar, Patna (IN)

(73) Assignee: Innoplexus AG, Eschborn (DE)

( * ) Notice: Subject to any disclaimer, the term of this patent is extended or adjusted under 35 U.S.C. 154(b) by 106 days.

(21) Appl. No.: 16/233,674

(22) Filed: Dec. 27, 2018

(65) Prior Publication Data
US 2019/0205389 A1 Jul. 4, 2019

(30) Foreign Application Priority Data
Dec. 30, 2017 (GB) ..................................... 1722305

(51) Int. Cl.
*G06F 40/58* (2020.01)
*G06F 40/30* (2020.01)
*G06F 40/279* (2020.01)

(52) U.S. Cl.
CPC ............ *G06F 40/30* (2020.01); *G06F 40/279* (2020.01); *G06F 40/58* (2020.01)

(58) Field of Classification Search
CPC ....................................................... G06F 40/58
See application file for complete search history.

(56) References Cited

U.S. PATENT DOCUMENTS

| | | | | |
|---|---|---|---|---|
| 9,342,505 B2 * | 5/2016 | Wu | .......................... | G06F 40/58 |
| 2001/0029455 A1 * | 10/2001 | Chin | ........................ | G06F 40/58 704/277 |
| 2008/0222133 A1 * | 9/2008 | Au | ......................... | G06F 16/951 |

* cited by examiner

*Primary Examiner* — Feng-Tzer Tzeng
(74) *Attorney, Agent, or Firm* — Ziegler IP Law Group, LLC

(57) ABSTRACT

Disclosed is a method and a system for identifying key terms in a digital document. The method comprises providing the digital document and analysing the digital document to identify key terms in the digital document. The digital document includes a first text in a first language. Furthermore, analysing the digital document comprises translating the first text in the first language to obtain a second text in a second language, translating the first text in the first language to obtain a third text in a third language, translating the obtained second text in the second language to obtain a fourth text in the third language, comparing at least one pair of first text, second text, third text and fourth text to identify at least one set of similar text between the compared at least one pair, and processing the set of similar text to obtain key terms in the digital document.

7 Claims, 1 Drawing Sheet

100

PROVIDE DIGITAL DOCUMENT, WHEREIN DIGITAL DOCUMENT INCLUDES FIRST TEXT IN FIRST LANGUAGE
102

ANALYSE DIGITAL DOCUMENT TO IDENTIFY KEY TERMS IN DIGITAL DOCUMENT
104

METHOD AND SYSTEM FOR IDENTIFYING KEY TERMS IN DIGITAL DOCUMENT

CROSS-REFERENCE TO RELATED APPLICATIONS

This application claims the benefit under 35 U.S.C. § 119(a) and 37 CFR § 1.55 to UK Patent Application No. GB1722305.8, filed on Dec. 30, 2017, the entire content of which is incorporated herein by reference.

TECHNICAL FIELD

The present disclosure relates generally to data analysis and processing, and more specifically, to identifying key terms in a digital document. Moreover, the present disclosure also relates to computer readable medium containing program instructions for execution on a computer system, which when executed by a computer, cause the computer to perform method steps for identifying key terms in a digital document.

BACKGROUND

In recent times, numerous sources are available to access information (namely a document, image, audio and the like) on specific topics or subject matter. Conventionally, a user performs search related to a publication work and/or a research work and accumulates information thereby. Generally, the vast information available contains key terms related to the search of the user. Typically, key terms in a document help the user in assessing the relevance of the document thereby. Consequently, the frequency of occurrence of a key term in the document further emphasizes the significance of the key term. Moreover, text available in the document conveys the context of usage of the key term. Typically, the text helps the user to ascertain the same meaning of the key term as intended.

Traditionally in a document, key terms identification is done using statistical methods. Generally, statistical methods provide visual representation of the relevance of the key terms. Typically, it evaluates the frequency of occurrence and its corresponding significance in the document. Moreover, the method increases the field of reference for assessing the key term. Furthermore, analysis of the document is done using automated systems. Consequently, manual effort and processing time is reduced considerably. Subsequently, the number of identified key terms increases.

However, analysis by statistical methods is a time-consuming approach. In addition, it may provide a skewed result reflecting only the current trend of key terms without considering the updated or refined versions available thereof. Moreover, automated systems, do not verify the context of usage of the key terms. Specifically, it may generate a huge set of key terms all of which may not be contextually relevant. Subsequently, the key terms need to be processed further to identify relevant key terms therein.

Therefore, in light of the foregoing discussion, there exists a need to overcome the aforementioned drawbacks associated with conventional methods of identifying key terms in a document.

SUMMARY

The present disclosure seeks to provide a method of identifying key terms in a digital document. The present disclosure also seeks to provide a system for identifying key terms in a digital document. Furthermore, the present disclosure seeks to provide a computer readable medium, containing program instructions for execution on a computer system, which when executed by a computer, cause the computer to perform method steps for identifying key terms in a digital document. The present disclosure seeks to provide a solution to time-consuming and ineffective methods of identifying key terms in a digital document. An aim of the present disclosure is to provide a solution that overcomes at least partially the problems encountered in prior art, and provides an efficient, dynamic and accurate method for identifying key terms in the digital document.

In first aspect, an embodiment of the present disclosure provides a method of identifying key terms in a digital document, wherein the method comprises:
providing the digital document, wherein the digital document includes a first text in a first language; and
analysing the digital document to identify the key terms in the digital document, wherein analysing comprises:
translating the first text in the first language to obtain a second text in a second language;
translating the first text in the first language to obtain a third text in a third language;
translating the obtained second text in the second language to obtain a fourth text in the third language;
comparing at least one pair of first text, second text, third text and fourth text to identify at least one set of similar text between the compared at least one pair; and
processing the at least one set of similar text to obtain key terms in the digital document.

In second aspect, an embodiment of the present disclosure provides a system for identifying key terms in a digital document, wherein the system comprises:
a translation module operable to:
receive the digital document, wherein the digital document includes a first text in a first language;
translating the first text in the first language to obtain a second text in a second language;
translating the first text in the first language to obtain a third text in a third language; and
translating the obtained second text in the second language to obtain a fourth text in the third language;
a processing module communicably coupled to the translation module, the processing module operable to identify the key terms by:
comparing at least one pair of first text, second text, third text and fourth text to identify at least one set of similar text between the compared at least one pair; and
processing the at least one set of similar text to obtain key terms in the digital document.

In third aspect, an embodiment of the present disclosure provides a computer readable medium, containing program instructions for execution on a computer system, which when executed by a computer, cause the computer to perform method steps for identifying key terms in a digital document, the method comprising the steps of:
providing the digital document, wherein the digital document includes a first text in a first language; and
analysing the digital document to identify the key terms in the digital document, wherein analysing comprises:
translating the first text in the first language to obtain a second text in a second language;
translating the first text in the first language to obtain a third text in a third language;
translating the obtained second text in the second language to obtain a fourth text in the third language;

comparing at least one pair of first text, second text, third text and fourth text to identify at least one set of similar text between the compared at least one pair; and processing the at least one set of similar text to obtain key terms in the digital document.

Embodiments of the present disclosure substantially eliminate or at least partially address the aforementioned problems in the prior art, and provides an improved and efficient method and system for identifying key terms in a digital document.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
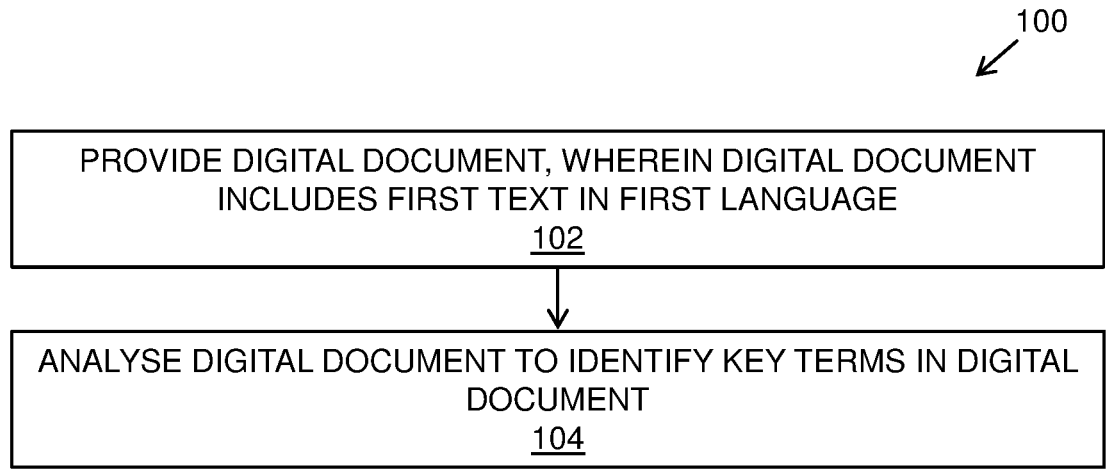
FIG. 1 is an illustration of steps of a method for identifying key terms in a digital document, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with identification of key terms from a digital document and specifically to, subjecting the digital document to multiple translation to identify key terms present therein.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of identifying key terms in a digital document, wherein the method comprises:

providing the digital document, wherein the digital document includes a first text in a first language; and analysing the digital document to identify the key terms in the digital document, wherein analysing comprises:

translating the first text in the first language to obtain a second text in a second language;

translating the first text in the first language to obtain a third text in a third language;

translating the obtained second text in the second language to obtain a fourth text in the third language;

comparing at least one pair of first text, second text, third text and fourth text to identify at least one set of similar text between the compared at least one pair; and processing the at least one set of similar text to obtain key terms in the digital document.

In another aspect, an embodiment of the present disclosure provides a system for identifying key terms in a digital document, wherein the system comprises:

a translation module operable to:

receive the digital document, wherein the digital document includes a first text in a first language;

translating the first text in the first language to obtain a second text in a second language;

translating the first text in the first language to obtain a third text in a third language; and translating the obtained second text in the second language to obtain a fourth text in the third language;

a processing module communicably coupled to the translation module, the processing module operable to identify the key terms by:

comparing at least one pair of first text, second text, third text and fourth text to identify at least one set of similar text between the compared at least one pair; and processing the at least one set of similar text to obtain key terms in the digital document.

The present disclosure seeks to provide a method and system for identifying key terms in the digital document and thereby providing an efficient and improved identification process. Beneficially, identification of key terms in the digital document simplifies understanding of the digital document. Moreover, employing ontology for identification refines the methodology. Additionally, the method dynamically updates the ontology employed for identification thereby broadening the possibility of identifying new key terms. Furthermore, the ontology helps in increasing the field of reference for identifying the key terms. Beneficially, the quality of key terms is ensured owing to the emphasis laid on identifying consistently recurring key terms through multiple language translations.

Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in a form of a table, a map, a grid, a packet, a datagram, a file, a document, a list or in any other form. The database arrangement includes any data storage software and system, such as, for example, a relational database like IBM DB2 and Oracle 9. Furthermore, the data storage software and system may include MongoDB, HBase, ElasticSearch, Neo4J, ArangoDB and so forth. Additionally, the database arrangement refers to a software program for creating and managing one or more databases. Optionally, the database arrangement may be operable to support relational operations, regardless of whether it enforces strict adherence to the relational model, as understood by those of ordinary skill in the art. Optionally, the database arrangement is operable to store the digital document. Optionally, the digital document may be available from publicly available sources including but not limited to scientific publications (abstract and full text), clinical text, theses, medical and healthcare news articles, scientific blogs, regulatory briefings and the like. Specifically, the digital document denotes a digital and/or electronic representation of contextual information in a format including but not limited to text, audio, image or combinations thereof.

Throughout the present disclosure, the term "key terms" as used herein, relates to a significant word, a phrase and/or a combination of words that remains equivalently comparable in multiple languages. Specifically, the key terms help in determining an idea or field fundamental to the digital document. The method and system comprise identifying key terms in the digital document. In an example, the key term "cancer" exists in English language. In French language, the key term "cancer" remains identical to its English equivalent. Furthermore, in Italian language, the key term "cancer" becomes "cancro" which remains equivalently comparable with the corresponding English and French occurrences. Moreover, there may be multiple key terms identified from single digital document. Furthermore, there may be a single key term associated with a particular digital document.

Throughout the present disclosure, the term "processing module" as used herein, relates to a computational element that is operable to respond to and process instructions. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term processing module may refer to one or more individual processors, processing devices and various elements associated with a processing device that may be shared by other processing devices. The system comprises the processing module communicably coupled to the database arrangement. Additionally, the one or more individual processors, processing devices and elements are arranged in various architectures for responding to and processing the instructions. Throughout the present disclosure, the term "communication module" as used herein, relates to an arrangement of interconnected programmable and/or non-programmable components that are configured to facilitate data communication between one or more electronic devices, software modules and/or databases, whether available or known at the time of filing or as later developed. Additionally, the communication module employs wired or wireless communication that can be carried out via any number of known protocols. Moreover, the communication module is operable to access the database arrangement and communicate the accessed data to the processing module. Consequently, the coupling of processing module and communication module enables exchange of data between the database arrangement and the processing module. Beneficially, the processing module comprises the communication module communicably coupling the processing module to the database arrangement.

Throughout the present disclosure, the term "language" as used herein, relates to a body of words, expressions and/or vocabulary known for common use by a group of people who are of a same profession, a community, a nation and/or same geographical area. Specifically, the digital document may be available in the language specific to its place of origin and/or specific to the language of an author of the digital document. Typically, each language includes a corresponding script which refers to a collection of alphabets and/or characters used to write the one or more languages. In an example, Latin script forms the root for languages including but not limited to English, French, Italian, German and so forth. In another example, Devanagari script forms the root for languages including but not limited to Hindi, Sanskrit, and so forth. In an embodiment, the digital document may be in any one of the languages but not limited to English, French, Italian, Hindi, Chinese, Japanese and the like. Optionally, the language may be a machine-readable data language like Extensible Markup Language (XML), Hyper-Text Markup Language (HTML), Python, PHP, .Net and the like.

As mentioned previously, the method comprises providing the digital document, wherein the digital document includes the first text in the first language. Specifically, the translation module is operable to receive the digital document from the database arrangement or publicly available sources including but not limited to scientific publications (abstract and full text), clinical text, theses, medical and healthcare news articles, scientific blogs, regulatory briefings and the like. Optionally, the digital document is provided by a user of the system from an open source database and/or proprietary databases granting licensed access to the user. Moreover, the translation module may provide an assorted list of digital documents to a user based on a user-input for a specific key term provided therein. Therefore, the user may select a particular digital document from the assorted list. Furthermore, the translation module may provide an input area to the user, wherein the user may input a text therein. Consequently, the text provided by the user in the input area may be analysed to identify key terms therefrom.

Throughout the present disclosure, the term "translation module" used herein relates to hardware, software, firmware or a combination thereof operable to translate text in a digital document. Specifically, the translation module may comprise an online or offline translation module. For example, "Google Translate", "Bing Translator", "Linguee" and the like are variants of the available online translation module. Optionally, the translation module employed may be as a standalone platform. Furthermore, the translation module may include any proprietary tool providing paid access to a user.

The processing module is operable to analyse the digital document to identify the key terms. Specifically, analysis of the digital document comprises subjecting the digital document to multiple language translations using a translation module. Moreover, analysis of the digital document helps to identify the key terms in the digital document. Additionally, performing multiple language translations assists in identifying the unchanging key terms contained in the digital document. Moreover, the initial language of the digital document may be considered as the first language of the digital document. Subsequently, translating the language of the first text from the first language would generate the second text in the second language and so on.

As mentioned previously, analysing comprises translating the first text in the first language to obtain the second text in the second language. In an example, when English is considered to be a first language and a first text is "Colon cancer is one of the best-understood neoplasms from a genetic perspective". In such example, when Spanish is considered to be a second language and a second text obtained using the translation module is "El cáncer de colon es uno de los neoplasmas mejor comprendidos desde una perspectiva genética". The translation module is operable to translate the first text in the first language to obtain the second text in the second language. Furthermore, the method comprises translating the first text in the first language to obtain the third text in the third language. Specifically, the first text is subjected to translation to the third language from the first language. Optionally, the second and the third language may have a different script from the first language script. In an example, when English is considered to be a first language and a first text is "Colon cancer is one of the best-understood neoplasms from a genetic perspective". In such example, when Italian is considered to be a third language and a third text obtained is "Il cancro del colon è una delle neoplasie meglio comprese da una prospettiva genetica". The translation module is operable to translate the first text in the first language to obtain the third text in the third language.

The method comprises translating the obtained second text in the second language to obtain the fourth text in the third language. Specifically, the second text is subjected to translation to the third language from the second language. In the above example, Spanish is considered to be a second language and a second text obtained is "El cáncer de colon es uno de los neoplasmas mejor comprendidos desde una perspectiva genética". In the same example, Italian is considered to be the third language and a fourth text obtained is "Il cancro del colon è una delle neoplasie meglio comprese da una prospettiva genetica". The translation module is operable to translate the obtained second text in the second language to obtain the fourth text in the third language. Furthermore, when a script of the second language is different in comparison to the third language, the third text and the fourth text may be different.

The method comprises comparing at least one pair of first text, second text, third text and fourth text to identify at least one set of similar text between the compared at least one pair. Specifically, the variants of text obtained in the first, second, and third language are compared to identify the unchanging and similar text occurring therein. In an instance, comparison at least one pair of text is considered. In one embodiment, the comparison may occur between a pair of first text in the first language and second text in the second language. In another embodiment, the comparison may occur between a pair of first text in the first language and third text in the third language. In yet another embodiment, the comparison may occur between a pair of first text in the first language and fourth text in the third language. Furthermore, in an embodiment, the comparison may occur between a pair of second text in the second language and third text in the third language. In an additional embodiment, the comparison may occur between a pair of second text in the second language and fourth text in the third language. Moreover, in another embodiment, the comparison may occur between a pair of third text in the third language and fourth text in the third language.

Throughout the present disclosure, the term "similarity methods" as used herein relates to a method for determining similarities between snippets of text. Moreover, similarity methods relate to a numerical statistic that is intended to reflect the importance of a term in the digital document. Specifically, it is often used as a weighting factor in the field of information retrieval and text mining. The numerical statistic value increases proportionally to the number of times the term appears in the digital document. Moreover, the commonly used similarity methods include but are not limited to "term frequency-inverse document frequency vectors" (tf-idf), "Cosine Similarity", "Euclidean Similarity", "Lucene", "LingPipe" and the like. The processing module is operable to analyse the digital document by comparing at least one pair of first text, second text, third text and fourth text to identify at least one set of similar text between the compared at least one pair. Specifically, the similar text occurring in the compared at least one pair is identified on the basis of any known similarity methods. Beneficially, the similarity methods assist in identifying at least one set of similar text occurring in the compared at least one pair. Specifically, the set of similar text refers to the number of recurring terms identified in the compared pair of text. Additionally, the similar text comprises the terms which display little variation even after multiple language translations. In the aforementioned example, the set of similar text obtained by the comparison of first text in the first language and third text in the third language may yield five similar terms. Similarly, the set of similar text obtained by the comparison of first text in the first language and fourth text in the third language may yield four similar terms. Moreover, the text is subjected to further language translations until a consistent set of similar text is identified. Furthermore, the consistent set of similar text is determined by the comparisons made between the subsequent pairs therein. Therefore, the set of similar text is generated as a representative list comprising the recurring terms thereof.

Throughout the present disclosure, the term "ontology" as used herein relates to a set of concepts (namely, information, ideas, data, semantic associations and so forth) in a field (namely, subject area, domain and so forth) that details types and properties of the set of concepts and semantic association thereof. Furthermore, ontology provides a base to identify key terms in the digital document. Moreover, ontology provides a structured, optimal and relevant set of concepts with identified known key terms present therein. Furthermore, ontology may be used in carrying out scientific research, academic studies, market analysis and so forth. Optionally, ontology may include concepts in form of text, image, audio, video, or any combination thereof. Additionally, the ontology may provide information relating to a certain concept in a certain field that may be associated with one or more concept in multiple fields. The method comprises processing the at least one set of similar text to obtain key terms in the digital document. Specifically, processing the set of similar text involves comparing the recurring terms in multiple language translations on the basis of the ontology. Moreover, the key terms are identified as concepts from the ontology. The processing module is operable to analyse the digital document by processing the at least one set of similar text to obtain key terms in the digital document. Furthermore, identifying the key terms helps in establishing the associated field therein.

Optionally, the method further comprises developing the ontology using at least one curated database. Furthermore, field of the at least one curated database is related to the developed ontology. Specifically, the at least one curated database may comprise information providing details on associations between a plurality of concepts. Additionally, the ontology is developed to include relevant information extracted from the at least one curated database. Optionally, the at least one curated database includes information in the form of text, image, audio, video, or any combination thereof. In an embodiment, the database arrangement is operable to store at least one curated database. In an example, the at least one curated database may comprise information related to biomedical entities, genes, proteins, drugs, diseases, species, pathways, biological processes, molecular functions, side effects, drug labels, clinical trial parameters, patient demographics and many other semantic types thereof. Furthermore, the at least one curated database may be extracted to build a Life Science ontology (including custom dictionary and meta-thesaurus) containing synonyms, derivational and functional form of different biomedical entities as well as Medical Subject Headings (MeSH). Furthermore, optionally, the at least one curated database and ontology extracted from thereof may include data about authors, geography and other biological and non-biological entities.

In an embodiment, developing an ontology using at least one curated database comprises applying conceptual indexing to plurality of terms stored in the at least one curated database. Optionally, conceptual indexing may include parsing of plurality of terms of the at least one curated database. Furthermore, parsing may generate one or more conceptual structure representing assembly of the plurality of terms to construct a relation therebetween. Optionally, the system comprises developing an ontology using at least one curated database by applying conceptual indexing to the plurality of terms stored in the at least one curated database. Moreover, conceptual indexing may be applied to terms to identify contextual meaning thereof. Beneficially, terms may be organized based on conceptual indexing thereof. Optionally, terms may be a set of information related to an entity, object and so forth. Furthermore, each individual piece of information about the object and so forth may forms the key terms. In an example, at least one curated database may include information related to books, author name, publication and so forth. Furthermore, terms stored in the at least one curated database may include information about one or more books. Moreover, terms corresponding to one or more books may include key terms pertaining to the one or more books (namely, book name, author name, publication and so forth). In an embodiment, developing an ontology using at least one curated database comprises identifying semantic associations between the plurality of terms, established in the at least one curated database. Furthermore, associations (namely relations, links and so forth) among the plurality of terms may be identified based on the conceptual indexing applied to terms stored in the at least one curated database. Beneficially, identifying semantic associations provide contextual (namely, inferred) relationships of the plurality of terms. Optionally, the semantic associations established in the at least one curated database are identified using at least one of: knowledge-based text mining, natural language processing. Furthermore, knowledge-based text mining provides semantic association between the plurality of terms based on identifying and analysing known information and associations. Optionally, the system comprises developing an ontology using at least one curated database by identifying semantic associations, between the plurality of terms, established in the at least one curated database.

Throughout the present disclosure, the term "class" relates to a collection (namely, cluster, group and so forth) of contextually similar text, audio, video, image or a combination thereof. Specifically, the class relates to the type of the term included in the ontology. Furthermore, the class may include many synonyms, abbreviations, linguistic variations, morphological forms and/or derivational entities for the plurality of terms associated therewith. In an example, the terms "Skin Toxicity", "Neoplasms", "Colorectal Cancer Metastasis", are associated to the class "Indication". In another example, the terms "BRCA1", "BRCA2", "p53", "CCR4" are associated to the class "Gene". In an embodiment, developing an ontology using at least one curated database comprises identifying at least one class tagged with the plurality of terms in the at least one curated database. Specifically, the terms are tagged with at least one class. Furthermore, key terms may be included in the at least one class (namely, group, cluster and so forth) based on contextual similarity thereof. Optionally, the system comprises developing the ontology using at least one curated database by identifying at least one class tagged with the plurality of terms in the at least one curated database. In an example, at least one class may be recognized by a traditional indexer. Furthermore, the class may be an organized set of terms comprising similar association therebetween.

In an embodiment, processing the at least one set of similar text comprises validating the at least one set of similar text based on the ontology to obtain key terms. Specifically, the identified key terms may be compared with the terms present in the ontology for validation thereof. Moreover, the ontology may comprise a list of terms wherein a probability of a term being a key term may be stored therewith. Consequently, the probability of the identified key terms may be retrieved and may be validated thereafter. Optionally, the processing module is operable to process the at least one set of similar text by validating the at least one set of similar text based on the ontology to obtain key terms Optionally, the method further comprises classifying the identified key terms based on the ontology. Specifically, the key terms are classified into the at least one class based on the ontology. In an example, the classes of key terms may be "Indication", "Gene", "Intervention", "Disease" and the like. Optionally, the processing module is operable to further classify the identified key terms based on the ontology.

Furthermore, there is disclosed a computer readable medium, containing program instructions for execution on a computer system, which when executed by a computer, cause the computer to perform method steps for identifying key terms in a digital document. The method comprising the steps of providing the digital document, wherein the digital document includes a first text in a first language; and analysing the digital document to identify the key terms in the digital document. Moreover, analysing the digital document comprises translating the first text in the first language to obtain a second text in a second language; translating the first text in the first language to obtain a third text in a third language; translating the obtained second text in the second language to obtain a fourth text in the third language; comparing at least one pair of first text, second text, third text and fourth text to identify at least one set of similar text between the compared at least one pair; and processing the at least one set of similar text to obtain key terms in the digital document.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method 100 for identifying key terms in a digital document, in accordance with an embodiment of the present disclosure. At a step 102, the digital document is provided, wherein the digital document includes a first text in a first language. At a step 104, the digital document is analysed to identify the key terms in the digital document. Furthermore, analysing the digital document comprises translating the first text in the first language to obtain a second text in a second language; translating the first text in the first language to obtain a third text in a third language; translating the obtained second text in the second language to obtain a fourth text in the third language; comparing at least one pair of first text, second text, third text and fourth text to identify at least one set of similar text between the compared at least one pair; and processing the at least one set of similar text to obtain key terms in the digital document.

Figure 2:
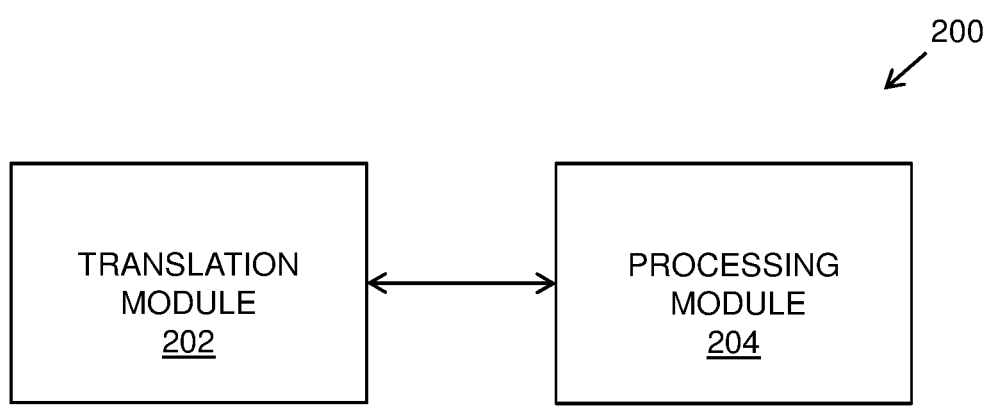
FIG. 2 is a block diagram of a system for identifying key terms in a digital document, in accordance with an embodiment of the present disclosure.

Referring to FIG. 2, illustrated is a block diagram of a system 200 for identifying key terms in a digital document, in accordance with an embodiment of the present disclosure. The system 200 comprises a translation module 202 operable to receive the digital document, wherein the digital document includes a first text in a first language. Furthermore, the translation module 202 is operable to translate the first text in the first language to obtain a second text in a second language, translate the first text in the first language to obtain a third text in a third language; and translate the obtained second text in the second language to obtain a fourth text in the third language. Moreover, the processing module 204, is operable to compare at least one pair of first text, second text, third text and fourth text to identify at least one set of similar text between the compared at least one pair. Additionally, the processing module 204 is operable to process the at least one set of similar text to obtain key terms in the digital document.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of identifying key terms in a digital document, wherein the method comprises:
   providing the digital document, wherein the digital document includes a first text in a first language; and
   analysing the digital document to identify the key terms in the digital document, wherein analysing comprises:
      translating the first text in the first language to obtain a second text in a second language;
      translating the first text in the first language to obtain a third text in a third language;
      translating the obtained second text in the second language to obtain a fourth text in the third language;
      comparing the third text and the fourth text to identify at least one set of similar text therebetween, wherein the at least one set of similar text is identified on the basis of known similarity methods, and wherein the at least one set of similar text is the number of recurring terms identified in the compared pair of text and comprises the terms which display little variation even after multiple language translations; and
      processing the at least one set of similar text to obtain key terms in the digital document, wherein processing the at least one set of similar text comprises validating the at least one set of similar text based on an ontology.

2. The method of claim 1, wherein the method further comprises developing the ontology using at least one curated database by:
   applying conceptual indexing to plurality of terms stored in the at least one curated database;
   identifying semantic associations, between the plurality of terms, established in the at least one curated database; and
   identifying at least one class tagged with the plurality of terms in the at least one curated database.

3. The method of claim 1, wherein the method further comprises classifying the identified key terms based on the ontology.

4. A system for identifying key terms in a digital document, wherein the system comprises:
   a translation module operable to:
      receive the digital document, wherein the digital document includes a first text in a first language;
      translate the first text in the first language to obtain a second text in a second language;
      translate the first text in the first language to obtain a third text in a third language; and
      translate the obtained second text in the second language to obtain a fourth text in the third language;
   a processing module communicably coupled to the translation module, the processing module operable to identify the key terms by:
      comparing the third text and the fourth text to identify at least one set of similar text therebetween, wherein the at least one set of similar text is the number of recurring terms identified in the compared pair of text and comprises the terms which display little variation even after multiple language translations; and
      processing the at least one set of similar text to obtain key terms in the digital document, wherein processing the at least one set of similar text comprises validating the at least one set of similar text based on an ontology.

5. The system of claim 4, wherein the database arrangement is operable to store at least one curated database, wherein the ontology is developed using at least one curated database by:
   applying conceptual indexing to plurality of terms stored in the at least one curated database;
   identifying semantic associations, between the plurality of terms, established in the at least one curated database; and
   identifying at least one class tagged with the plurality of terms in the at least one curated database.

6. The system of claim 4, wherein the processing module is operable to further classify the identified key terms based on the ontology.

7. A non-transitory computer readable storage medium, containing program instructions for execution on a computer system, which when executed by a computer, cause the computer to perform method steps for identifying key terms in a digital document, the method comprising the steps of:
   providing the digital document, wherein the digital document includes a first text in a first language; and
   analysing the digital document to identify the key terms in the digital document, wherein analysing comprises:
      translating the first text in the first language to obtain a second text in a second language;
      translating the first text in the first language to obtain a third text in a third language;
      translating the obtained second text in the second language to obtain a fourth text in the third language;
      comparing the third text and the fourth text to identify at least one set of similar text therebetween, wherein the at least one set of similar text is the number of recurring terms identified in the compared pair of text and comprises the terms which display little variation even after multiple language translations; and processing the at least one set of similar text to obtain key terms in the digital document, wherein processing the at least one set of similar text comprises validating the at least one set of similar text based on an ontology.

* * * * *